United States Patent
Shaibani et al.

(10) Patent No.: US 7,412,118 B1
(45) Date of Patent: Aug. 12, 2008

(54) MICRO FIBER OPTICAL SENSOR

(75) Inventors: Sanan Shaibani, Woodland Hills, CA (US); A. Douglas Meyer, Woodland Hills, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 11/679,462

(22) Filed: Feb. 27, 2007

(51) Int. Cl.
  *G02B 6/00* (2006.01)
(52) U.S. Cl. .......................... 385/12; 385/13
(58) Field of Classification Search ............. 385/12–13; 356/477, 932
See application file for complete search history.

(56) References Cited

U.S. PATENT DOCUMENTS

| 5,363,342 | A | 11/1994 | Layton et al. |
| 5,364,430 | A | 11/1994 | Sarkar |
| 5,381,504 | A | 1/1995 | Novack et al. |
| 5,504,720 | A | 4/1996 | Meyer et al. |
| 5,558,693 | A | 9/1996 | Sarkar |
| 6,389,204 | B1 | 5/2002 | Hurley |
| 6,474,106 | B1 | 11/2002 | Crossland et al. |
| 6,571,582 | B2 | 6/2003 | Bhandarkar et al. |
| 6,849,333 | B2 | 2/2005 | Schissel et al. |
| 6,865,327 | B2 | 3/2005 | Atkins et al. |
| 7,046,890 | B2 | 5/2006 | Sparks |
| 7,116,850 | B2 * | 10/2006 | Woo ........................... 385/13 |
| 2002/0152771 | A1 | 10/2002 | Bhandarkar et al. |
| 2003/0012478 | A1 * | 1/2003 | Pokrovski et al. ............. 385/7 |
| 2004/0163420 | A1 | 8/2004 | Dowd et al. |
| 2004/0202401 | A1 * | 10/2004 | Berg et al. .................... 385/12 |
| 2005/0031283 | A1 | 2/2005 | Fabian et al. |
| 2005/0069271 | A1 | 3/2005 | Sparks |
| 2006/0133753 | A1 | 6/2006 | Nelson et al. |
| 2006/0263024 | A1 | 11/2006 | Dong et al. |

* cited by examiner

*Primary Examiner*—Hemang Sanghavi
(74) *Attorney, Agent, or Firm*—Tarolli, Sundheim, Covell & Tummino LLP

(57) ABSTRACT

A method is provided for producing an optical acoustic sensor. In one embodiment, a method comprises winding a single-mode optical sensor fiber around at least one mandrel. The optical acoustic sensor fiber can comprise a core region having a diameter of about 2 μm to about 8 μm and a cladding region having an outer diameter of about 8 μm to about 20 μm. The method can also comprise interconnecting the at least one mandrel into an optical acoustic sensor.

11 Claims, 3 Drawing Sheets

MICRO FIBER OPTICAL SENSOR

TECHNICAL FIELD

The present invention relates to optical communications and, more particularly, to a micro fiber optical sensor.

BACKGROUND OF THE INVENTION

Optical fibers can be used in any of a variety of different communications and sensing applications. For example, optical fiber-based acoustic sensors can be used for undersea applications. An optical fiber-based acoustic sensor can be formed by winding a length of optical fiber around a mandrel, where the fiber can be up to tens of hundreds of meters long. The sensor industry typically uses a conventional reduced-cladding fiber (80 µm diameter), which is an improvement over a standard-size (125 µm) fiber. A mode field diameter can typically be in the range of 7-10 µm, so light can be concentrated within the core region of the optical fiber and possibly a layer of a few microns of the cladding adjacent to it.

Most fiber-based acoustic sensors detect sound by determining a differential phase delay of light propagating through a length of optical fiber and the associated environmental strain placed on the fiber, as demonstrated below:

$$\frac{\Delta\Phi}{\Phi} = \varepsilon_z - \frac{\eta^2}{2}[(P_{11} + P_{12})\varepsilon_r + P_{12}\varepsilon_z] \quad \text{Equation 1}$$

Where: $P_{11}$ and $P_{12}$ are the elasto-optic coefficients for fused silica;

$\eta$ is the refractive index of the fiber core; and $\varepsilon_z$ and $\varepsilon_r$ are the longitudinal and radial strains, respectively.

Alternatively, Equation 1 can be expressed explicitly as a function of fiber length and radius, as demonstrated below:

$$\frac{\Delta\Phi}{\Phi} = \frac{\Delta L}{L} - \frac{\eta^2}{2}\left[(P_{11} + P_{12})\frac{\Delta r}{r} + P_{12}\frac{\Delta L}{L}\right] \quad \text{Equation 2}$$

Where: L is the fiber length; and r is the fiber radius.

In the first order, the phase shift is dominated by the axial strain, and the radial component can thus be ignored. Therefore, Equation 2 can be rewritten as follows:

$$\frac{\Delta\Phi}{\Phi} = \frac{\Delta L}{L}\left(1 - \frac{\eta^2}{2}P_{12}\right) \quad \text{Equation 3}$$

Based on Equations 1-3, it is demonstrated that, to increase phase shift, one can change the elasto-optic coefficient, increase an amount of strain per unit length experienced by the fiber, or increase the fiber length. However, the elasto-optic coefficient is a material property and is considered to be invariant. In addition, the amount of strain per unit length is governed by the transduction of force to the fused silica base material. Furthermore, increasing the fiber length may be impractical from a design, manufacturing, and cost perspective.

SUMMARY OF THE INVENTION

One embodiment of the present invention comprises a method. The method comprises winding a single-mode optical sensor fiber around at least one mandrel. The optical acoustic sensor fiber can comprise a core region having a diameter of about 2 µm to about 8 µm and a cladding region having an outer diameter of about 8 µm to about 20 µm. The method can also comprise interconnecting the at least one mandrel into an optical acoustic sensor.

Another embodiment of the present invention comprises a method. The method comprises applying a jacket material to a single-mode optical sensor fiber such that a radius of the jacket material and a radius of a cladding region of the single-mode optical sensor fiber have a ratio of at least 8. The method also comprises implementing the single-mode optical sensor fiber comprising the jacket material in a sensor.

Another embodiment of the present invention includes an optical acoustic sensor. The optical acoustic sensor comprises a single-mode optical sensor fiber. The single-mode optical sensor fiber comprises a core region having a diameter of about 2 µm to about 8 µm, and a cladding region having an outer diameter of about 8 µm to about 20 µm. The optical acoustic sensor also comprises at least one mandrel around which the single-mode optical sensor fiber is wound.

DETAILED DESCRIPTION OF INVENTION

The present invention relates to optical communications and, more particularly, to an optical sensor fiber. The optical sensor fiber can be formed by drawing a multi-mode optical fiber, such as a conventional, commercially available multi-mode optical fiber. The optical sensor fiber can be a single-mode optical sensor fiber, and can have a cladding-to-core ratio that is substantially equal to a cladding-to-core ratio of the multi-mode optical fiber from which optical sensor fiber is formed. As an example, the optical sensor fiber can have a core region diameter of about 2 µm to about 8 µm and a cladding region outer diameter of about 8 µm to about 20 µm. The optical sensor fiber can be coated with a jacket material, and can be wound around a mandrel, for example, for use in an optical acoustic sensor.

Figure 1:
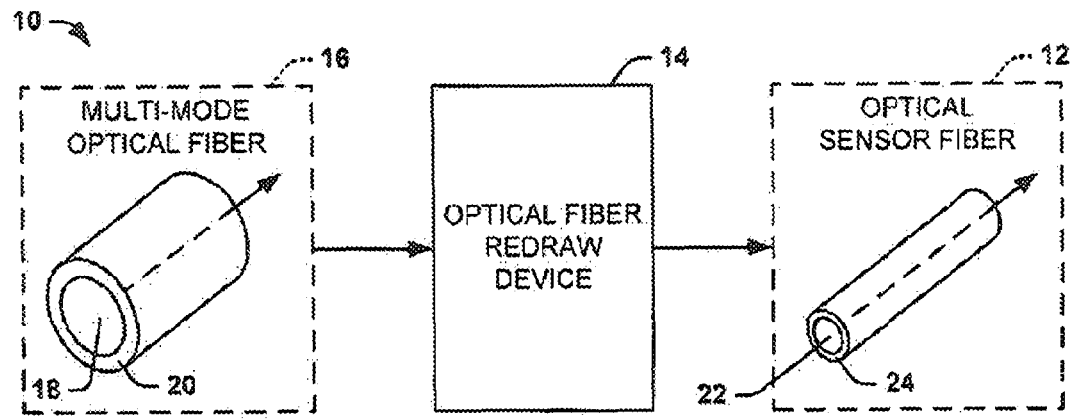
FIG. 1 illustrates an example of a system for forming an optical sensor fiber in accordance with an aspect of the invention.

FIG. 1 illustrates an example of a system 10 for forming an optical sensor fiber 12 in accordance with an aspect of the present invention. The system 10 includes an optical fiber redraw device 14. The optical fiber redraw device 14 is provided a multi-mode optical fiber 16, and is configured to draw the multi-mode optical fiber 16 to form the optical sensor fiber 12. The multi-mode optical fiber 16 can be, for example, a conventional, commercially available multi-mode optical fiber including a core region 18 and a cladding region 20. Thus, because the multi-mode optical fiber 16 includes a core region 18 that is multi-mode, higher order optical modes can propagate through the multi-mode optical fiber 16. However, upon drawing the multi-mode optical fiber 16 to generate the optical sensor fiber 12, the multi-mode core region 18 and the cladding region 20 of the multi-mode optical fiber 16 become a single-mode core region 22 and a cladding region 24, respectively. The optical sensor fiber 12 thus includes a core region 22 that is single-mode, such that only the lowest order optical mode can propagate through the optical sensor fiber 12. Therefore, the optical sensor fiber 12 can be implemented as a single-mode optical sensor fiber.

It is to be understood that the process of drawing (i.e., redrawing) the multi-mode optical fiber 16, as used herein, includes heating and pulling the multi-mode optical fiber 16 to form the optical sensor fiber 12. As an example, the multi-mode optical fiber 16 could have been initially formed from a seeded preform material, such that the seeded preform material could have been drawn (i.e., heated and pulled) to form the multi-mode optical fiber 16. As such, the optical fiber redraw device 14 is configured to draw the material forming the multi-mode optical fiber 16 again, such that multi-mode optical fiber 16 is drawn subsequent to being drawn from the seeded preform material. As a result of the multi-mode optical fiber 16 being redrawn, the optical sensor fiber 12 has a cross-sectional diameter that is substantially less than the multi-mode optical fiber 16 and a length that is substantially greater than the multi-mode optical fiber 16.

The optical fiber redraw device 14 can be configured to apply a predetermined amount of heat, such as from carbon dioxide laser heating, to draw the multi-mode optical fiber 16 at a predetermined draw speed, for example, by implementing a precision motor, to form the optical sensor fiber 12. As an example, the optical fiber redraw device 12 can be a draw tower that is reconfigured to redraw the multi-mode optical fiber 16, instead of drawing a seeded preform, such as typically drawn to form other optical fibers. However, because the drawing of only a nominal length of the multi-mode optical fiber 16 can form a substantially longer optical sensor fiber 12, the optical fiber redraw device 14 may be significantly smaller than a typical draw tower, such as could be implemented on a table or desk surface. In addition, the optical fiber redraw device 14 can draw the multi-mode optical fiber 16 to provide a specific reduction factor. As such, the diameter of the core region 18 and the outer diameter of the cladding region 20 of the multi-mode optical fiber 16 are each reduced by a common factor (i.e., the specific reduction factor) to generate the core region 22 and the cladding region 24 of the optical sensor fiber 12. Therefore, the optical sensor fiber 12 can have a core-to-cladding ratio that is substantially equal to a core-to-cladding ratio of the multi-mode optical fiber 16.

Because the optical sensor fiber 12 can be a single-mode optical sensor fiber with a core-to-cladding ratio substantially the same as the multi-mode optical fiber 16, the optical sensor fiber 12 can have an outer diameter that is significantly smaller than the multi-mode optical fiber 16, as well as other commercially available single-mode optical fibers. For example, the optical sensor fiber 12 can have a core region diameter of about 2 µm to about 8 µm and a cladding region outer diameter of about 8 µm to about 20 µm. As a specific example, a given multi-mode optical fiber 16 having a core region 18 with a diameter of approximately 50 µm and a cladding region 20 with an outer diameter of approximately 125 µm can be drawn with a reduction factor of 12.5 to form an optical sensor fiber 12 having a core region 22 with a diameter of approximately 4 µm and a cladding region 24 with an outer diameter of approximately 10 µm.

Figure 2:
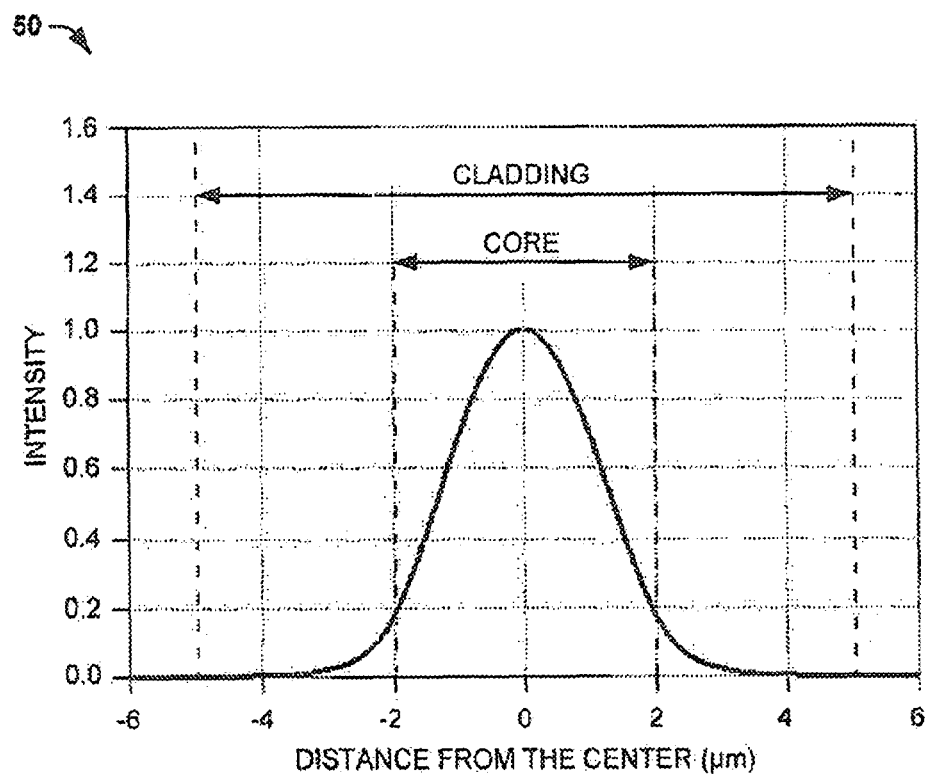
FIG. 2 illustrates an example of a graph of optical mode intensity of an optical sensor fiber in accordance with an aspect of the invention.

The optical sensor fiber 12 can be configured with an optical performance that is at least equivalent to a larger fiber. FIG. 2 illustrates an example of a graph 50 of optical mode intensity of the optical sensor fiber 12 in accordance with an aspect of the present invention. In the example of FIG. 2, the optical sensor fiber 12 is demonstrated as having a core region diameter of approximately 4 µm and a cladding region outer diameter of approximately 10 µm, and can have a numerical aperture of approximately 0.3. The mode intensity profile depicted in the graph 50 in the example of FIG. 2 can be for an optical beam having a wavelength λ that is approximately 1.55 µm.

As demonstrated in the example of FIG. 2, the optical intensity outside the cladding region 20 is less than $10^{-5}$ times that of the center of the core region 22. Thus, the thickness of the cladding region 24 is sufficient to prevent interference of optical mode energy with the sidelobes of the optical mode energy of the core region 22. Therefore, there is substantially no evanescent field outside the cladding region 24 of the optical sensor fiber 12 that can couple to adjacent optical fibers and/or adjacent lengths of the same optical sensor fiber 12, such as upon being wound around a mandrel. Accordingly, cross-talk and/or phase delay of the adjacent optical fiber and/or length of the same optical sensor fiber 12 can be substantially mitigated.

In addition, the optical sensor fiber 12 can be coated with a jacketing material, such as a polymer coating. Application of a jacketing material on a given optical fiber can have an effect on acoustic sensitivity of the given optical fiber per meter length, such as in an optical acoustic sensor application, based on a ratio of a radius of the jacketing material and a radius of the optical fiber. A more acoustically sensitive optical fiber can result in a greater optical phase shift of an optical acoustic sensor based on an increase in an amount of strain per unit length of the optical fiber, thus providing for a more effective optical acoustic sensor. As a result of having such a small diameter, the optical sensor fiber 12 can exhibit a significant increase in acoustic sensitivity per meter length based on a greater ratio of jacket radius to fiber radius. For example, the jacketed optical sensor fiber 12 can have a jacket radius to fiber radius of at least 8.

For example, a conventional optical fiber having a diameter of 80 µm and a jacketing material having a diameter of 160 µm has a jacket radius to fiber radius ratio of 2. However, an optical sensor fiber 12 having a diameter of 10 µm and a jacketing material having a diameter of 160 µm has a jacket radius to fiber radius ratio of 16. Therefore, a jacketed optical sensor fiber 12 can have eight times the jacket radius to fiber radius ratio of a standard jacketed optical fiber of substantially equal thickness. Accordingly, the jacketed optical sensor fiber 12 can be significantly more acoustically sensitive per meter length. In addition, the optical sensor fiber 12 can be jacketed in an air-entrapped jacketing material. For example, the jacketing material can include an air-entrapped portion that can increase the Poisson's ratio of the jacketing material based on a ratio of the amount of trapped air to the jacketing material. As a result of the increased Poisson's ratio of the jacketing material, the compressibility of the jacketing material is increased, thus further increasing the acoustic sensitivity per meter length of the optical sensor fiber.

Figure 3:
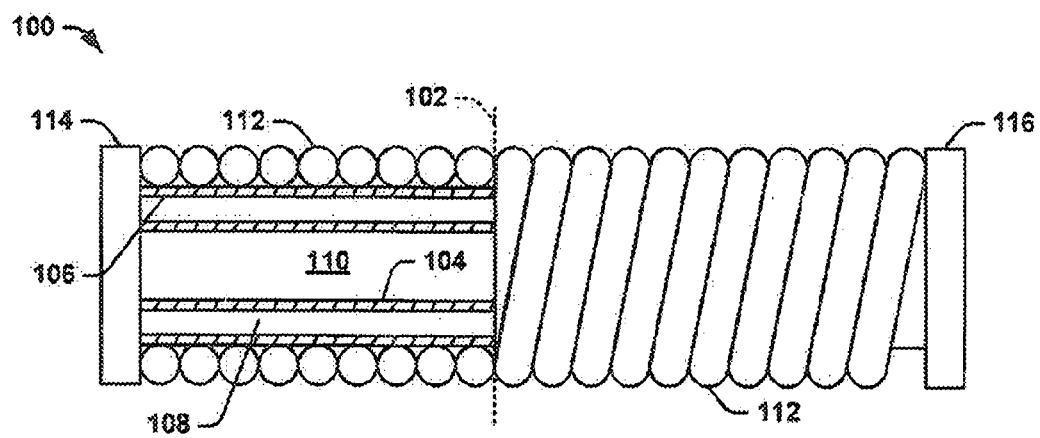
FIG. 3 illustrates an example of a mandrel including an optical sensor fiber in accordance with an aspect of the invention.

As described above, an optical fiber-based acoustic sensor can be formed by winding a length of optical fiber around one or more mandrels. FIG. 3 illustrates an example of a mandrel 100 including the optical sensor fiber 12 in accordance with an aspect of the present invention. The example of FIG. 3 demonstrates an exterior of the mandrel 100 to the right of a dashed line 102, and demonstrates a longitudinal cross-section to the left of the dashed line 102.

The mandrel 100 includes an inner cylinder 104 and the outer cylinder 106, demonstrated as being concentric in the example of FIG. 3. A cavity 108 is enclosed between the inside of the outer cylinder 106 and the outside of the inner cylinder 104. The cavity 108 can be filled, for example, with air or any of a variety of gases. The cavity 108 can provide compliance of the mandrel 100 that increases the response of the associated optical acoustic sensor (not shown) to incident acoustic signals. The inner cylinder 104 is demonstrated in the example of FIG. 3 as enclosing a region 110 that can be filled with polyurethane or any of a variety of other similar substances. The ends of the cylinders 104 and 106 can be sealed, such that no water or other foreign substance can enter the cavity 108 during application of the mandrel 100 in an optical acoustic sensor, such as in an underwater application.

A coiled length of optical sensor fiber 112 is wound under tension around the outer cylinder 106. The optical sensor fiber 112 can be substantially similar to the optical sensor fiber 12 described above with reference to FIGS. 1 and 2, and can include a jacketing material. The mandrel 100 is demonstrated in the example of FIG. 3 as including a pair of end flanges 114 and 116 that can retain the coiled optical sensor fiber 112 on the outer cylinder 106. Upon submersing the mandrel 100 in water, the coiled optical sensor fiber 112 can be exposed to acoustic waves. Increases in acoustic pressure can compress the coiled optical sensor fiber 112 and the outer cylinder 106, such that the optical path length of optical signals propagating in the coiled optical sensor fiber 112 can be shortened. As a result, an optical phase shift can be detected. Decreases in acoustic pressure on the coiled optical sensor fiber 112 allow the outer cylinder 106 to expand in diameter. Thus, the coiled optical sensor fiber 112 can be stretched, increasing the optical path length and changing the optical phase shift differential.

As described above in the example of FIGS. 1 and 2, a given length of the optical sensor fiber 112 can be more acoustically sensitive per meter length than a conventional optical fiber. Therefore, an amount of the optical sensor fiber 112 required to manufacture a sensor with equivalent sensitivity can be much less than an amount of conventional optical fiber. As an alternative, a mandrel 100 that implements a length of the optical sensor fiber 112 that is substantially the same as a conventional optical fiber can result in a significantly more sensitive optical acoustic sensor. In addition, an amount of stress on a given optical fiber can be approximately proportional to the diameter of the given optical fiber. Thus, for a given bending radius, an amount of stress on the surface of the optical sensor fiber 112 can be significantly less than an amount of stress on the surface of a conventional optical fiber due to the reduced diameter of the optical sensor fiber 112 being closer to the neutral bending axis. Therefore, the microfiber 112 can be wound around the mandrel 100 with a smaller bend diameter. Accordingly, a smaller (i.e., reduced diameter) mandrel 100 can be implemented with the optical sensor fiber 112, and the associated optical acoustic sensor can utilize an increased upper frequency band of light.

In addition to the above described benefits of the optical sensor fiber 112 over a conventional optical fiber, implementation of the optical sensor fiber 112 can also result in a significant cost advantage over the use of a conventional optical fiber. As described above in the example of FIG. 1, when a multi-mode optical fiber is redrawn, the resultant optical sensor fiber 112 has a cross-sectional diameter that is substantially less than the multi-mode optical fiber and a length that is substantially greater than the multi-mode optical fiber. Thus, a given length of multi-mode optical fiber can be drawn to form a much greater length of the optical sensor fiber 112. For example, for an optical acoustic sensor made with 1000 m of an 80 µm conventional optical fiber, at a price of approximately $1.50/meter, the total cost of the conventional optical fiber is $1500. In contrast, assuming a modest 10 times increase in acoustic sensitivity, an optical acoustic sensor configured to provide a substantially similar amount of performance as the above conventional example can implement only 100 meters of optical sensor fiber 112. Therefore, assuming 1 meter of a convention optical fiber can be drawn at $5.00/meter to form 100 meters of optical sensor fiber 112, a cost savings of approximately 300 times can be realized.

It is to be understood that the mandrel 100 in the example of FIG. 3 is but one example of a mandrel for use in an optical acoustic sensor. Thus, the mandrel 100 can be implemented in any of a variety of different manners for use in an optical acoustic sensor. In addition, a given optical acoustic sensor can be configured with more than one of the mandrel 100 and/or other types of mandrels in a given acoustic sensing application. In addition, as described in greater detail below, the optical sensor fiber 112 on the mandrel 100 can be configured to interface with existing optics that implement conventional optical fibers. Furthermore, the optical sensor fiber 12 described in the examples of FIGS. 1 and 2 is not limited to optical acoustic sensors that implement an optical sensor fiber wound around a mandrel, such as demonstrated in the example of FIG. 3. As such, the optical sensor fiber 12 described in the examples of FIGS. 1 and 2 can be implemented in any of a variety of sensors that utilize an optical fiber, such as a sensor mat or an acceleration sensor.

Figure 4:
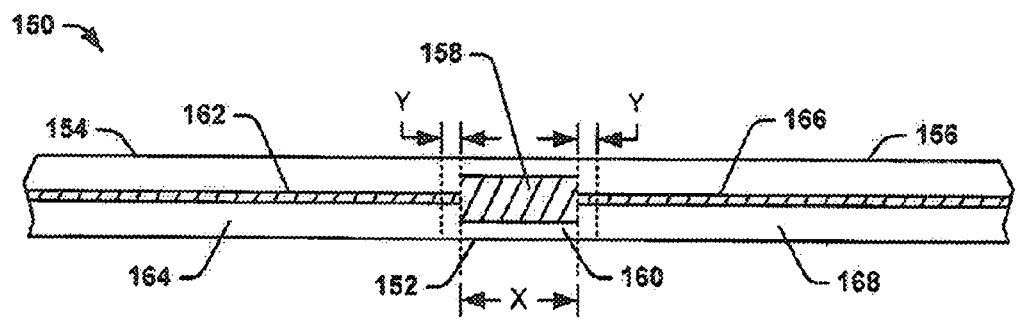
FIG. 4 illustrates an example of a longitudinal cross-section of an optical fiber in accordance with an aspect of the invention.

FIG. 4 illustrates an example of a longitudinal cross-section of an optical fiber assembly 150 in accordance with an aspect of the invention. The optical fiber assembly 150 includes a multi-mode portion 152, as well as a first single-mode portion 154 and a second single-mode portion 156. The multi-mode portion 152 includes a core region 158 and a cladding region 160. The core region 158 is a multi-mode core, such that higher order optical modes could propagate through the multi-mode portion 152. The first single-mode portion 154 includes a core region 162 and a cladding region 164, and the second single-mode portion 156 includes a core region 166 and a cladding region 168. The core regions 162 and 166, in the example of FIG. 4, are single-mode cores, such that only the lowest order optical mode can propagate through the first single-mode portion 154 and the second single-mode portion 156.

The first single-mode portion 154 and the second single-mode portion 156 are coupled to each end of the multi-mode portion 152. As an example, the first single-mode portion 154 and the second single-mode portion 156 may be fusion spliced to the multi-mode portion 152. The multi-mode portion 152 is demonstrated in the example of FIG. 4 as having a length dimension X. The multi-mode portion 152 may be a length of conventional multi-mode optical fiber that is drawn to form an optical sensor fiber, such as the optical sensor fiber 12 in the example of FIG. 1. Therefore, the first single-mode portion 154 and the second single-mode portion 156 can be fusion spliced to the multi-mode portion 152 prior to the draw process, such that the first single-mode portion 154 and the second single-mode portion 156 can provide an interface to other portions of an optical acoustic sensor that implement conventional fiber. Furthermore, a portion of each of the first single-mode portion 154 and the second single-mode portion 156, demonstrated in the example of FIG. 4 as a dimension Y extending from each end of the multi-mode portion 152, can likewise be drawn during the draw process of the multi-mode portion 152. Therefore, a transition is provided from the conventional size of the first single-mode portion 154 and the second single-mode portion 156 to the small size of the resultant optical sensor fiber.

Figure 5:
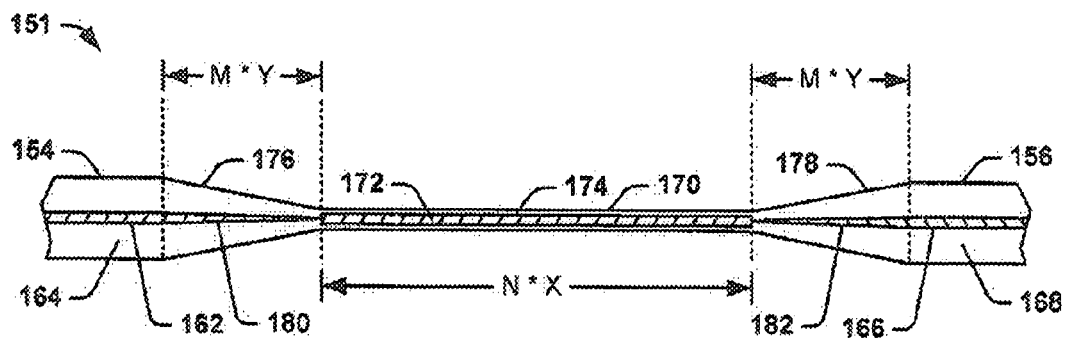
FIG. 5 illustrates another example of a longitudinal cross-section of an optical fiber in accordance with an aspect of the invention.

FIG. 5 illustrates another example of a longitudinal cross-section of an optical fiber assembly 151 in accordance with an aspect of the invention. The optical fiber assembly 151 in the example of FIG. 5 depicts the optical fiber assembly 150 in the example of FIG. 4 subsequent to the drawing of the multi-mode portion 152 to form an optical sensor fiber 170. The optical sensor fiber 170 includes a core region 172 and a cladding region 174. Because the optical sensor fiber 170 was formed based on a given reduction factor, the core region 158 and the cladding region 160 of the multi-mode portion 152 are each reduced in cross-sectional diameter by the same reduction factor in forming the core region 172 and the cladding region 174 of the optical sensor fiber 170. Therefore, the optical sensor fiber 170 has a core-to-cladding ratio that is substantially equal to a core-to-cladding ratio of the multi-mode portion 152. In addition, the optical sensor fiber 170 has a length dimension of N*X, where N is a number greater than one. As an example, N could be 100.

In addition to the drawing of the multi-mode portion 152 to form the optical sensor fiber 170, the optical fiber assembly 151 in the example of FIG. 5 also includes a first partially drawn portion 176 and a second partially drawn portion 178. The first partially drawn portion 176 and the second partially drawn portion 178 are the portions of the first single-mode portion 154 and the second single-mode portion 156, respectively, drawn along the dimension Y in the example of FIG. 4. The first partially drawn portion 176 and the second partially drawn portion 178 have each been partially drawn to provide a transition from the conventional size of the first single-mode portion 154 and the second single-mode portion 156 to the small size of the resultant optical sensor fiber 170. Thus, the outer surface of each of the first partially drawn portion 176 and the second partially drawn portion 178 is tapered from the diameter of the first single-mode portion 154 and the second single-mode portion 156, respectively, to the diameter of the optical sensor fiber 170.

Similar to as described above, the first partially drawn portion 176 and the second partially drawn portion 178 are each formed based on a given reduction factor that is a function of the length along the respective first single-mode portion 154 and the second single-mode portion 156, respectively. It is to be understood that the reduction factor for the first partially drawn portion 176 and the second partially drawn portion 178 may not be linear, and may not be equal to each other at equal lengths along the first single-mode portion 154 and the second single-mode portion 156. As a result, the core region 162 of the first single-mode portion 154 is partially drawn to form a core region 189 of the first partially drawn portion 176, and the core region 166 of the second single-mode portion 156 is partially drawn to form a core region 182 of the second partially drawn portion 178. The core regions 180 and 182 may be reduced in cross-sectional diameter less than the core region 172 of the optical sensor fiber 170. Such a reduction in cross section of the core regions 162 and 166, combined with the fusion splicing, could result in propagation loss of the mode energy. However, such a loss may be insignificant (e.g., 0.6 dB). In addition, the first partially drawn portion 176 and the second partially drawn portion 178 each have a length dimension of M*Y, where M is a number greater than one but less than N. It is to be understood that, despite the first partially drawn portion 176 and the second partially drawn portion 178 being of equal length in the example of FIG. 5, each of the first partially drawn portion 176 and the second partially drawn portion 178 could be drawn differently (e.g., with a different draw speed and/or temperature), such that each has a different length relative to the other.

As a result of the transition of the first partially drawn portion 176 and the second partially drawn portion 178 between the optical sensor fiber 170 and the first single-mode portion 154 and the second single-mode portion 156, respectively, the optical sensor fiber 170 can be implemented in an optical acoustic sensor that also implements convention optical fibers. Therefore, a mandrel that incorporates the optical sensor fiber 170, such as the mandrel 100 in the example of FIG. 3, can be retrofitted onto an existing optical acoustic sensor or implemented in another optical system without a replacement of other optical fibers.

Figure 6:
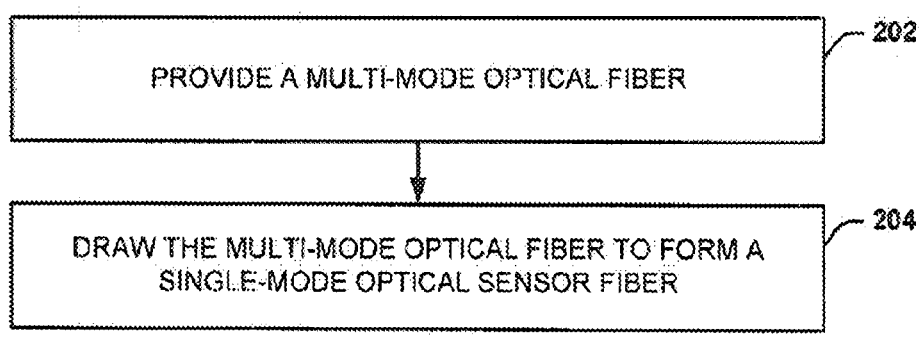
FIG. 6 illustrates an example of a method of forming an optical sensor fiber in accordance with an aspect of the invention.
Figure 7:
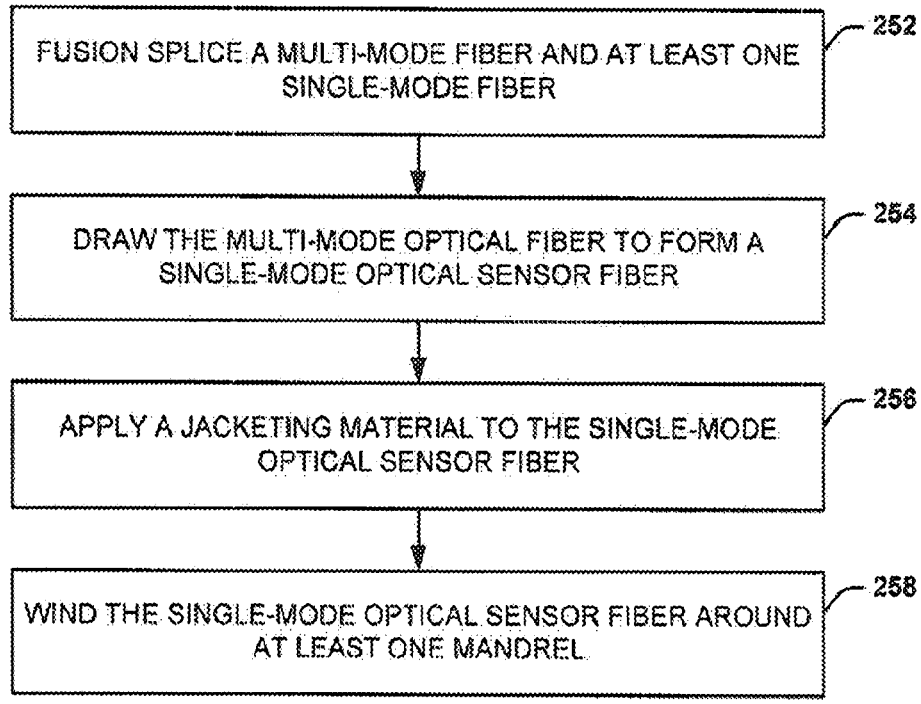
FIG. 7 illustrates an example of a method of manufacturing an optical acoustic sensor that implements an optical sensor fiber in accordance with an aspect of the invention.

In view of the foregoing structural and functional features described above, methodologies in accordance with various aspects of the present invention will be better appreciated with reference to FIGS. 6 and 7. While, for purposes of simplicity of explanation, the methodologies of FIGS. 6 and 7 are shown and described as executing serially, it is to be understood and appreciated that the present invention is not limited by the illustrated order, as some aspects could, in accordance with the present invention, occur in different orders and/or concurrently with other aspects from the shown and described herein. Moreover, not all illustrated features may be required to implement a methodology in accordance with an aspect the present invention.

FIG. 6 illustrates a method 200 of forming an optical sensor fiber in accordance with an aspect of the invention. At 202, a multi-mode optical fiber is provided. The multi-mode optical fiber can be a conventional multi-mode optical fiber that includes a multi-mode core region. At 204, the multi-mode optical fiber is drawn to form a single-mode optical sensor fiber. The drawing of the multi-mode optical fiber can be performed with a predetermined reduction factor, such that a core-to-cladding ratio of the multi-mode optical fiber can be substantially the same as the resultant optical sensor fiber. The resultant optical sensor fiber can have a single-mode core, and can have a core region diameter of about 2 μm to about 8 μm and a cladding region outer diameter of about 8 μm to about 20 μm.

FIG. 7 illustrates an example of a method 250 of manufacturing an optical acoustic sensor that implements an optical sensor fiber in accordance with an aspect of the invention. At 252, a multi-mode optical fiber and at least one single-mode optical fiber are fusion spliced together. The multi-mode optical fiber can have a single-mode optical fiber fusion spliced at each end. The multi-mode optical fiber and the at least one single-mode optical fiber can be conventional, commercially available optical fibers and can have a substantially similar diameter. The at least one single-mode optical fiber can be implemented to interface a resultant optical sensor fiber with other conventional optical fibers.

At 254, the multi-mode optical fiber is drawn to form a single-mode optical sensor fiber. The drawing of the multi-mode optical fiber can be performed with a predetermined reduction factor, such that a core-to-cladding ratio of the multi-mode optical fiber can be substantially the same as the resultant optical sensor fiber. The resultant optical sensor fiber can have a single-mode core, and can have a core region diameter of about 2 μm to about 8 μm and a cladding region outer diameter of about 8 μm to about 20 μm. In addition, a portion of the at least one single-mode fiber can be partially drawn to provide a tapered transition from the diameter of the conventional single-mode optical fiber to the diameter of the single-mode optical sensor fiber.

At 256, a jacketing material is provided to the single-mode optical sensor fiber. The jacketing material can be a polymer material that coats the single-mode optical sensor fiber, and can have an air-entrapment in the jacketing material. At 258, the single-mode optical sensor fiber is wound around at least one mandrel. The at least one mandrel can form a portion of an optical acoustic sensor.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A method for producing an optical acoustic sensor, the method comprising:
   winding a single-mode optical sensor fiber around at least one mandrel, the optical acoustic sensor fiber comprising a core region having a diameter of about 2 μm to about 8 μm and a cladding region having an outer diameter of about 8 μm to about 20 μm; and
   interconnecting the at least one mandrel into an optical acoustic sensor.

2. The method of claim 1, further comprising applying a jacket material to the resultant single-mode optical sensor fiber.

3. The method of claim 2, further comprising entrapping air in the jacket material.

4. The method of claim 2, wherein applying the jacket material comprises applying the jacket material to the resultant single-mode optical sensor fiber at a ratio between a radius of the jacket material and a radius of the cladding of at least 8.

5. A method comprising:
   applying a jacket material to a single-mode optical sensor fiber such that a radius of the jacket material and a radius of a cladding region of the single-mode optical sensor fiber have a ratio of at least 8; and
   implementing the single-mode optical sensor fiber comprising the jacket material in a sensor.

6. The method of claim 5, wherein implementing the single-mode optical sensor fiber comprising the jacket material in the sensor comprises winding the single-mode optical sensor fiber around a mandrel that is comprised in an optical acoustic sensor.

7. The method of claim 5, wherein the cladding region of the single-mode optical sensor fiber has an outer diameter of about 8 μm to about 20 μm, and wherein the single-mode optical sensor fiber comprises a core region having a diameter of about 2 μm to about 8 μm.

8. The method of claim 5, further comprising entrapping air in the jacket material.

9. An optical acoustic sensor comprising:
   a single-mode optical sensor fiber comprising:
      a core region having a diameter of about 2 μm to about 8 μm; and
      a cladding region having an outer diameter of about 8 μm to about 20 μm;
   at least one mandrel around which the single-mode optical sensor fiber is wound.

10. The optical acoustic sensor of claim 9, wherein the single-mode optical sensor fiber comprises a jacket material, and wherein a ratio between a radius of the jacket material and a radius of the cladding region is at least 8.

11. The optical acoustic sensor of claim 10, wherein the jacket material comprises entrapped air.

* * * * *